United States Patent Office 3,316,108
Patented Apr. 25, 1967

3,316,108
ALUMINA TITANATE BONDED MAGNESIA
Richard N. Blomberg, Wilmington, Del., assignor to E. I. du Pont de Nemours and Company, Wilmington, Del., a corporation of Delaware
No Drawing. Filed May 21, 1963, Ser. No. 282,175
5 Claims. (Cl. 106—62)

This invention relates to methods of bonding refractory materials into refractory products which are suitable for use at extremely high temperatures and also relates to the products thus formed.

New developments and improvements in metallurgical processes are often seriously limited by the performance of the available refractory materials in applications such as furnace linings. This is especially true in the high temperature conditions of the basic oxygen converter. Available refractories soften under load, are slagged by the charge of the process and suffer excessive spalling losses so that the conditions of operation or the length of operations between changing of linings is seriously limited.

It is an object of the present invention to provide a method of bonding magnesia grains into a refractory that is useful under high temperature conditions.

A further object is to provide a refractory having increased strength at elevated temperatures, reduced susceptibility to slag attacks and good resistance to heating under a cyclic oxidizing and reducing atmosphere. Other objects will become apparent from the following specification.

These objects have been attained by molding and firing a refractory of magnesia containing 2.8 to 31% (preferably 2.8 to 14%) alumina and 2.2 to 24% (preferably 2.2 to 11%) titania, the alumina and titania being present in about equimolar amounts. The product will have from about 3.9 to 43.0%, preferably up to 19.5% of magnesium aluminate ($MgAl_2O_4$) and from about 4.4 to 48.4%, preferably up to 22.1%, of magnesium titanate ($Mg_2TiO_4$). The uncombined magnesia is present substantially in the form of periclase and ranges from about 8.6 to 91.7% and preferably below about 58.4%.

This product is characterized by a flexural strength at 1550° of at least 250 lbs./inch$^2$, an apparent density of at least 2.7 grams/cm.$^3$, and good resistance to heating under cyclic oxidizing and reducing atmospheres. The novel refractories also have relatively low permeability (usually less than $50 \times 10^{-11}$ cm.$^2$), excellent resistance to basic slags and iron-iron oxide at 1400–2000° C. and good thermal shock properties so they are particularly useful in ferrous metallurgy applications, other high temperature furnace applications and the like.

The process of the invention comprises:

I. Preparing a refractory batch consisting of by weight:
   A. 45 to 95% magnesia (preferably 75 to 95%),
   B. 2.8 to 31% alumina (preferably 2.8 to 14%),
   C. 2.2 to 24% titania (preferably 2.2 to 11%),
   the mol ratio of alumina to titania being about 0.8 to 1.1.
II. Molding the mixture into a designated shape; and
III. Firing the molded structure.

The magnesia used can be calcined magnesite, the so-called Solvay magnesia, magnesia obtained from sea water, electrically fused magnesia or periclase itself. Preferably the magnesia should contain at least 89% MgO and should be low in silica and CaO (preferably less than 5% of either). The particle size and shape of the magnesia should be selected to afford good packing and should include at least 33% by weight of particles which pass a 100-mesh screen, the remainder passing through a 3.5-mesh screen.

The alumina for the refractory mix of the invention may be used in the form of alpha corundum such as tabular alumina, gamma alumina or hydrated aluminas, boehmite (AlOOH), purified bauxite, precipitated alumina hydroxide and aluminas prepared by the Bayer process. The alumina or alumina-yielding compound should be essentially free of low melting materials or materials which form low melting compounds with the alumina and is preferably at least 95% $Al_2O_3$. It should preferably pass a 100-mesh sieve.

The titania should be a substantially pure finely divided $TiO_2$ preferably smaller than 200-mesh particle size.

If the alumina and titania of the refractory batch are present in the form of substantially pure aluminum titanate ($Al_2O_3 \cdot TiO_2$), it is unexpectedly found that the refractory which results has substantially higher hot flex strength than the product prepared from a mix in which the alumina and titania have not been prefired.

In general, as much as 5 to 10% of impurities can be tolerated in the mix if they do not drastically change the desired properties of the product. Thus, some free titania (in excess over the equivalent amount of $Al_2O_3$) can be present. Free alumina tends to reduce the densification of magnesia and therefore amounts greater than about 10% in excess over the equivalent amount of available titania should be avoided.

Aluminum titanate can be formed from the above-mentioned forms of alumina and titania by intimately mixing molar weights of the fine powders pressing into blocks and firing at temperatures between about 1200 and 1860° for a period of time needed to produce the aluminum titanate. Preferably the firing takes place at 1500–1700° for 1 to 10 hours. The fired block may be readily broken up and ground to pass a convenient size, e.g., 100-mesh screen before using. If desired, this may be mixed with substantially equimolar proportions of unreacted alumina and titania prior to admixture with magnesia.

The magnesia, alumina and titania or the magnesia and the aluminum titanate in the refractory batch are intimately mixed together. They can be milled together as in a ball mill. Depending on the nature of the magnesia employed, it may be desirable to use minor amounts of water, alcohol, ethylene glycol, aqueous solutions of carboxy methyl cellulose, solutions of rubber, gum arabic, polyvinyl alcohol, natural gums, glue and the like to increase the green strength of the shaped object. Such binders would be mixed with the refractory batch.

The refractory batch is shaped at from 3000 to about 10,000 lbs./in.$^2$ pressure. If a binding agent has been used, the shaped forms should be dried until most of the volatile material from the binder has been removed. The dried shapes will be fired at temperatures of from above about 1200° C. to as high as 2400° C. for a period of 2 to 24 hours. Preferably the shapes are fired at a temperature of over 1400° C. and more preferably over 1700° C.

TESTING PROCEDURES

All sieve measurements are made with U.S. Sieve Series.

Apparent densities are determined by weighing the body in air and measuring the mass volume of the body including open and closed pores. Densities given below were all determined in this manner.

Flexural strength is measured according to ASTM Standard 1958, part 4, page 670, test C293–57T with the use of a span width of 1 to 4 inches.

IRON OXIDE PENETRATION TEST

The small face of a brick size sample is drilled to form a ¾-inch diameter hole 2¾ inches deep. The hole is filled with 100 grams of finely powdered FeO and the brick then heated to 1650° C. and held for 5 hours while the atmosphere is cycled between oxidizing and reducing every 20 minutes. The cold brick is cut in half through the axis of the hole and the penetration (below the bottom of the hole) of FeO in inches is measured on the cut face.

RESISTANCE TO OXIDIZING-REDUCING CONDITIONS

A sample 0.75 by 0.75 by 5 inches long is placed in a mullite tube furnace maintained at about 1400° C. The following cycle of atmosphere is observed: a sweep with nitrogen gas for 1 minute, a flow (ca. 700 ml./minute) of carbon monoxide for 30 minutes, a sweep of nitrogen gas for 1 minute and a flow of (ca. 700 ml./minute) of oxygen for 15 minutes. This cycle is continued for the time desired and the sample removed, cooled and examined. This cycle is representative of the atmosphere present in a basic oxygen converter (e.g., Linz-Donawitz).

AIR PERMEABILITY TEST

A sample is cut to 2.0 x 2.8 x 2.8 cm. (±0.2 cm.). Four sides are coated with beeswax. One side is open for the entrance of air and a funnel is attached to an aluminum gasket which is then sealed to the opposite side with beeswax. Air is pulled through the sample and a flowmeter to a vacuum pump.

Permeability in $cm.^2$ =

$$\text{Permeability in cm.}^2 = \frac{B \times C \times E}{A \times D \times 60}$$

A = length of sample × width of sample in cm.
B = height of sample in cm.
C = flow of air in ml./minute
D = ΔP of vacuum in dynes/$cm.^2$
E = viscosity of air (0.000183 poise)

Example I

A refractory batch is prepared from 144 grams of magnesia (burned at 1500° C., 98% MgO; 100–200 mesh, 48%, 200–325 mesh, 36%, 325 mesh, 16%) and 36 grams of aluminum titanate. The dry batch is mixed well and molded in a 1″ x 4″ mold at 4000 pounds per square inch (p.s.i.). The brick is fired in a gas furnace up to about 1730° C. in 5 hours and held at that temperature for 24 hours. X-ray diffraction analysis shows the fired brick to consist of periclase, magnesium titanate ($Mg_2TiO_4$), and magnesium aluminate ($MgAl_2O_4$). Petrographic examination of the fired brick shows the periclase grains to be bonded with a uniform and dense phase of a solid-solution of magnesium aluminate and magnesium titanate. The periclase grains are highly interpenetrated with this solid-solution (item a).

The aluminum titanate used above is made from an equimolar mixture of boehmite (a colloidal alumina monohydrate which calcines at 1500° C. to >99% $Al_2O_3$) and titania (99.8% $TiO_2$ —325 mesh). The two components are mixed well and molded in a 6″ x 6″ mold at about 1000 p.s.i. The molded brick is fired at 1580° C. for 5 hours. The fired brick is quite weak and is easily broken. It is roughly ground with a mortar and pestle and then ground in a laboratory hammer mill to pass 100 mesh.

The procedure used for making item a is repeated: omitting the aluminum titanate to make item b; replacing the aluminum titanate with an equal weight of an unreacted equivalent mixture of boehmite and titania to make item c; replacing the aluminum titanate with a weight of boehmite equivalent to the alumina in the aluminum titanate to make item d; and replacing the aluminum titanate with a weight of titania present in the aluminum titanate to make item e.

Physical properties of the bricks are summarized in Table I. It is noted that the items made from aluminum titanate or an analytical equivalent (items a and c) have significantly higher flexural strengths than do the other samples (items b, d, and e). Furthermore, the use of the crystalline compound, aluminum titanate, in item a affords markedly superior results to the analytical equivalents of alumina and titania in item c. This superiority is also demonstrated by the higher density and lower shrinkage of item a as compared to item c.

TABLE 1

| Item | Magnesia percent | Bonding Agent Type | Shrinkage, percent | Density, g./$cm.^3$ | Flexural Strength, 1,550° |
|---|---|---|---|---|---|
| a | 80 | $Al_2O_3 \cdot TiO_2$ | 8.7 | 3.19 | 7,140 |
| b | 100 | None | 7.0 | 3.14 | 340 |
| c | 80 | $Al_2O_3$ + $TiO_2$ | 12.6 | 3.08 | 3,930 |
| d | 87.8 | $Al_2O_3$ | 11.5 | 2.98 | 890 |
| e | 90 | $TiO_2$ | 12.6 | 3.27 | 390 |

Example II

A refractory batch is prepared containing 90% magnesia (burned at 2500° F. to 98% MgO, 98% passes 325 mesh) and 10% aluminum titanate (−100 mesh). The dry components are intimately mixed in a commercial bread dough mixer and then molded at 1100 p.s.i. in a 6″ x 6″ mold. The brick is fired to 1580° C. and held at that temperature for 10 hours. It contains 9% magnesium titanate and 8% magnesium aluminate, the remainder being substantially all magnesia.

The aluminum titanate used is made by firing an equivalent mixture of the titania of Example I and pure alumina trihydrate (65% $Al_2O_3$, Alcoa C–35 of −100 mesh which affords >99% $Al_2O_3$ at 1500° C.) to 1580° C.

A sample of the fired magnesia brick is subjected to 179 cycles of oxidizing to reducing atmospheres at 1400° C. It only loses 0.1% of its weight compared to 0.8% weight loss of a high grade commercial magnesia brick. The brick is still quite dense (3.36 g./$cm.^3$ apparent) and has excellent strength at 1550° C. after the cyclic treatment. The permeability of the fired brick (originally $16 \times 10^{-11}$ $cm.^2$) is relatively unchanged by cyclic treatment to a value of $13 \times 10^{-11}$ $cm.^2$ whereas the permeability of the commercial brick increases from $220 \times 10^{-11}$ to $520 \times 10^{-11}$ $cm.^2$ after the same cyclic treatment. Samples of tar-bonded dolomite brick became too porous to test permeability after this treatment. These data indicate that the product of this invention is well suited for drastic refractory conditions such as the basic oxygen converter.

Example III

A refractory batch is prepared of 1280 grams of magnesia (electrically fused, analyzing 89% MgO, 6% $SiO_2$; 90% passes 325 mesh), 320 grams of aluminum titanate as prepared in Example I and 150 ml. of a 50% aqueous solution of gum arabic. The intimately mixed batch is molded in a 4.5″ x 4.5″ mold. The damp brick is dried for about 16 hours in a vacuum oven at 120° C. and the dried brick fired at 1550° C. for 10 hours. The product contains 58% of magnesia, 18% of magnesium titanate and 16% of magnesium aluminate, the remainder being impurities. The fired brick (apparent density 3.12 g./$cm.^3$) has an iron oxide penetration of only 0.1 inch compared to a brick made in the same manner with the exclusion of the aluminum titanate which has an iron oxide penetration of 1.2 inches.

Example IV

An equal molar mixture of the colloidal boehmite and titania of Example I is ball milled with water and the slurry evaporated to dryness on a steam bath. The dried mixture is powdered, placed in a dense alumina crucible and fired to 1550° C. in a gas furnace. The material shrinks to a rather firm mass which is shown to be the compound $Al_2O_3 \cdot TiO_2$ by X-ray analysis. This is powdered to pass 100 mesh.

A refractory batch is prepared from 46.8% of magnesia (electrically fused, analyzing 99% MgO and passing 325-mesh sieve) and 53.2% of the above aluminum titanate. Samples are molded from the dry batch and are fired from 300 to 1000° C. over a 20-hour period followed by one hour at about 1550° C. A cooled sample shows only about 3% shrinkage, has a density of 2.8 grams/cm.$^3$, a porosity of 12% and a flexural strength at 1550° C. of 1650 p.s.i. The melting point determined by an optical pyrometer is 2400° C. Based on the starting materials, the product is calculated to contain 11% of magnesia, 47% magnesium titanate and 42% magnesium aluminate.

Basic iron oxide slag is placed on top of a fired sample of the above product and heated with a torch. No attack of the sample occurs in 15 minutes heating at 1400° C. or in two minutes at 1900° C.

What is claimed is:

1. A process for preparing a refractory having high strength at elevated temperatures comprising molding a mixture of alumina and titania in the molar ratio of between about 0.08 to 1.1, firing the mixture at a temperature of between about 1200 to 1860° C., grinding the fired mass, intimately mixing the particulated product with magnesia so that the mix contains between about 45 and 95 weight percent magnesia, molding the mix into a designated form and firing the molded mixture at a temperature of between 1200° C. to 2400° C.

2. A process for preparing a refractory comprising preparing a powder mix of 45 to 95% magnesia, 2.8 to 31% alumina and 2.2 to 24% titania, all on a weight basis, the mol ratio of alumina to titania being between about 0.8 and 1.1, forming a refractory shape therefrom and firing the same at a temperature of between 1200° C. to 2400° C.

3. The process of claim 2 wherein the titania powder passes a 200-mesh screen, the alumina powder passes a 100-mesh screen and the magnesia powder passes a 3.5-mesh screen.

4. A molded, fired refractory consisting essentially of, on a weight basis, between about 8.6 and 91.7% magnesia, between about 4.4 and 48.4% $Mg_2TiO_4$ and between about 3.9 and 43% $MgAl_2O_4$, the alumina and titania in said refractory being present in about equimolar amounts.

5. A process for preparing a refractory comprising firing a molded mixture of particulated aluminum titanate and magnesia in the proportion 45 to 95% by weight of magnesia and said aluminum titanate formed from 2.8 to 31% by weight of alumina and 2.2 to 24% by weight of titania, the mole ratio of alumina to titania being between about 0.8 and 1.1 at a temperature of between 1200° C. to 2400° C.

References Cited by the Examiner

UNITED STATES PATENTS 2,137,135  11/1938  Fuwa et al. _____ 106—39

TOBIAS E. LEVOW, *Primary Examiner.*

J. E. POER, *Examiner.*